REDUCTION OF EFFECT OF HITS ON TELEGRAPH RECEPTION

Filed June 24, 1957 2 Sheets-Sheet 1

INVENTOR
H. J. BRITT
BY
John E. Cassidy
ATTORNEY

Aug. 22, 1961 H. J. BRITT 2,997,543

REDUCTION OF EFFECT OF HITS ON TELEGRAPH RECEPTION

Filed June 24, 1957 2 Sheets-Sheet 2

INVENTOR
H. J. BRITT

BY

John E. Cassidy
ATTORNEY 2,997,543
Patented Aug. 22, 1961

2,997,543

REDUCTION OF EFFECT OF HITS ON TELEGRAPH RECEPTION

Horace J. Britt, Alexandria, Va., assignor to American Telephone and Telegraph Company, a corporation of New York Filed June 24, 1957, Ser. No. 667,602
7 Claims. (Cl. 178—69)

This invention relates to hit suppressors in telegraph systems, data transmission systems, or other pulse signal systems. Particularly, the invention is an improved hit suppressor which minimizes the effect of hits in such systems.

An object of the invention is the improvement of hit suppressors.

By a hit is meant an electrical discharge, caused by lightning, static or other agency, which tends to disrupt transmission of signals in a communication system by inducing momentary transient voltages. These may augment or oppose the potential of a then prevailing signaling condition in a system. In certain systems which employ two-condition signal elements, for instance, in which one condition is a current signal element and the other condition is a no-current signaling element, a hit occurring while the no-current condition prevails may simulate a current condition signal, causing erratic operation. In one frequency-shift carrier telegraph system, wherein the signals transmitted are alternating currents of a first frequency for a first signal condition and of a second frequency for a second signal condition, it has been found that hits operate on occasions, when the transmission level of one of the signaling conditions becomes low, to change the prevailing signal to one of opposite condition. The effects on pulse transmission systems in certain areas and in certain seasons due to the vagaries of weather and other conditions are at times so severe that the circuits become inoperable. This is especially true in certain data transmission systems where the signals transmitted define numbers representing quantities, which may involve billing for service usage, for instance.

The present invention proposes a hit suppressing arrangement which has been found to produce a substantial reduction in the effect of hits. Under very severe conditions these effects are not entirely eliminated. However, their reduction is so marked that circuits on which the invention has been tried during periods of severe electrical disturbance and which, without benefit of the present suppressor, were at that time non-commercial due to excessive errors, have been found to operate well within acceptable limits.

The invention depends upon the known fact that most disturbances caused by lightning or static are of short duration relative to the duration of a signal element in most pulse code systems. The present invention eliminates the effect of most hits by preventing transition from one signal condition to another in the receiver for an interval which is longer in duration than that of hits presently prevailing. This is done by a delay arrangement which makes the receiver insensitive to attempted signal transitions unless they persist for a longer time than that introduced by the delay.

A feature of the present invention, therefore, is an arrangement which delays a transition from say the marking condition to the spacing condition and vice versa on each signal transition for an interval which is greater in duration than the duration of the hits prevailing at the time and which is equal for each transition.

The duration of hits varies at different times. Therefore, the delay arrangement in the present circuit is made adjustable. That is to say, the delay in transition in the receiver after the reception of a signal can be established at any desired amount, over a range, dependent upon the length of the hits which are affecting transmission at the time. The adjustment is made manually by means of a variable resistor in a resistor-capacitor circuit.

The invention may be understood from the following description when read with reference to the associated drawings, which taken together, disclose a preferred embodiment in which the invention is presently incorporated. It is to be understood, however, that the invention may be incorporated in other forms which will be readily suggested to those skilled in the art from a consideration of the present disclosure.

Refer now to the drawings in which.

In the following description, it is to be understood that the values of constants cited are by way of example. In the circuit drawing, a source of grounded positive or negative potential is represented by a small circle enclosing a + or — symbol, respectively.

Figure 1:
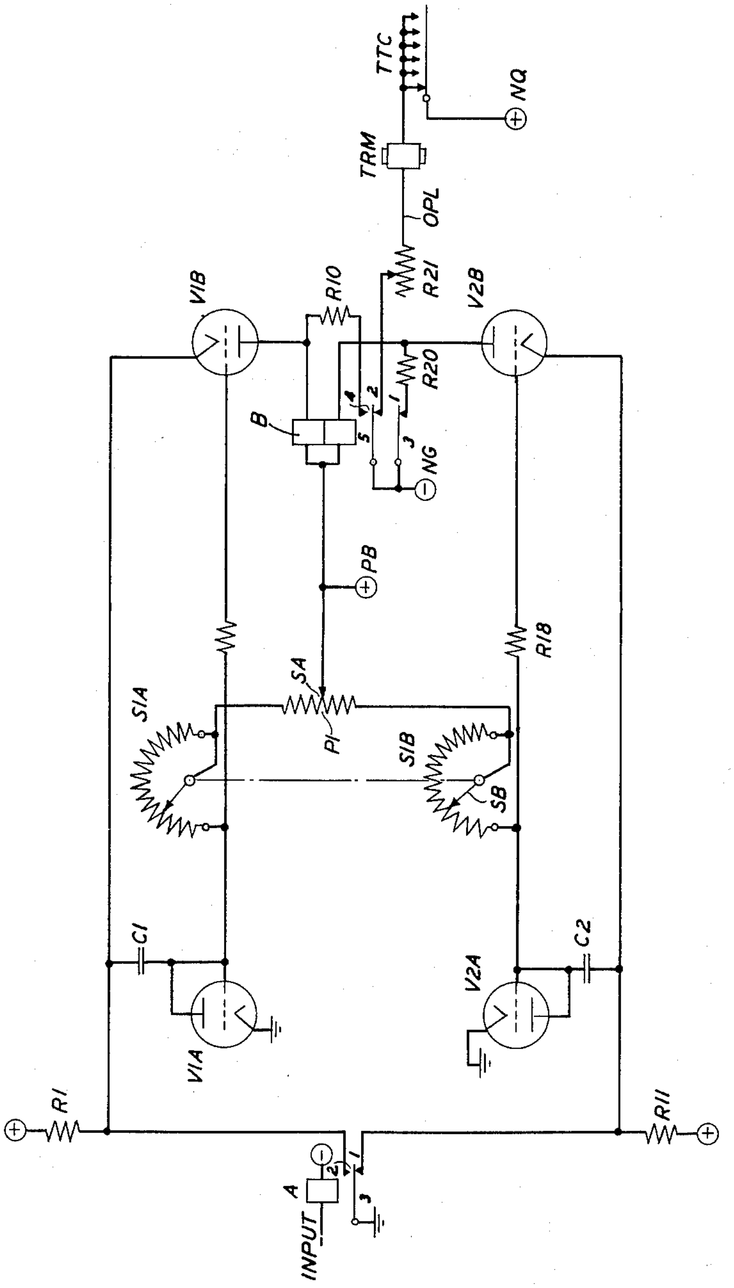
FIG. 1 shows the circuit of the present invention.

First the operation of the circuit will be described generally. Refer now to FIG. 1. In FIG. 1 relay A, shown at the left in the figure, corresponds to the usual receiving relay, one of which, or the equivalent, forms a part of every pulse signal receiver. The input conductor connected to the left-hand terminal of its winding may be connected, for instance, to the output of a telegraph circuit or to the output of any of a large number of data transmission systems. Relay B shown at the right in the drawing is an auxiliary receiving relay. The signals received by relay A have each transition between signals of different condition delayed for an equal interval, by what is essentially a two-channel delay circuit, one for each signal condition, interconnecting relays A and B. In response to received signals, some of which have been subjected to hits, the armature 3 of relay A is actuated between its contacts 1 and 2.

To consider operation in response to signals of a particular code, as an illustration, when five-element two-condition signals, sometimes called Baudot code signals, are received, each of the five-character forming signal elements will be of uniform duration and each group of five may contain marking and spacing elements arranged in any one of the possible permutations. During the reception of the five-element combination, the armature 3 may remain in engagement with its marking contact 1 for the duration of a single signal element, for instance. Then it may be operated to engage with its contact 2 for an interval equal to 1 or 2 or more signal elements and then may be actuated to reengage with its contact 1 for an interval equal to the duration of one or more signal elements, until all five of the signal elements have been received. Relay A transmits the signals through the upper or lower delay channel to relay B, which becomes effectively the real receiving relay of the system. The armature 3 of relay A will respond immediately on a signal transition whether it be bona fide or spurious as when caused by a hit. The armatures 3 and 5 of relay B, however, will be delayed in their transition in a manner to be explained hereinafter. Armature 5 will remain in engagement with contacts 2 and 4 for an equal delay interval on each transition. Let us assume that this delay interval on the first transition is 60 milliseconds. The next transition whether occurring at the end of a single signal element or at the end of two or more signal elements will be similarly delayed for 60 milliseconds. Thus the duration of the single signal element or of a sequence of two or more will be of standard duration, as the armature 5 of relay B through which marking and spacing signals are transmitted, will be delayed for an equal interval on each transition. Thus, the duration of the signal elements transmitted by relay B over output conductor OPL to the output circuit will be the same as the duration of the signals received by relay A.

Because of the delay and a locking arrangement to be described hereinafter, unless an incoming signal condition which is effective to operate relay A persists for an interval longer than the duration of the delay for which the circuit is set at any time, the incoming signal can have no effect on relay B. Short spurious transitions of relay A due to hits are in effect wiped out.

It was mentioned in the foregoing that the duration of hits impressed on a circuit due to atmospheric conditions will vary at different times. The present circuit includes facilities which compensate for this by making the delay in transitions adjustable so that they may be maintained longer than the duration of hits prevailing at any time. This may be done by manually adjusting potentiometers S1A and S1B.

The manner in which the circuit operates will now be described in detail.

Incoming pulses will operate the input relay A. When the circuit is in the idle condition and when it is in the marking condition, the armature 3 of relay A is in engagement with its contact 1. A circuit may then be traced from ground through armature 3 and contact 1 of relay A to the upper terminal of resistor R11, lower terminal of capacitor C2 and the cathode of triode V2B in parallel. A circuit may be traced from grounded positive battery PB to the slider SA of potentiometer P1, lower portion of the potentiometer P1 through the slider SB and right-hand portion of potentiometer S1B in parallel, left-hand portion of potentiometer S1B, anode and grid of triode V2A, connected in parallel as a rectifier, and the cathode of tube V2A to ground. Tube V2A is conducting for this condition. The drop across tube V2A is quite low so that the potential of its anode is near ground and this potential is applied through resistor R18 to the grid of triode V2B which conducts for this condition. A circuit may now be traced from grounded positive battery PB through the lower winding of relay B, from the anode to the cathode of triode V2B and contact 1 and armature 3 of relay A to ground. The effect of current flowing in this path actuates armatures 3 and 5 of relay B to engage with their contacts 1 and 2, respectively. A circuit may be traced from grounded negative battery NG through armature 5 and contact 2 of relay B, potentiometer R21, output conductor OPL, teletypewriter receiving magnet TRM and teletypewriter transmitter contacts TTC to grounded positive battery NQ.

Triode V1B will be non-conducting, as contact 2 of relay A is open and grounded positive 130-volt battery is applied through resistor R1 to the cathode of triode V1B while its grid is near ground potential. The reason that the grid of triode V1B is near ground potential is that triode V1A, connected as a diode, is connected in a circuit from grounded positive battery PB through the upper portion of potentiometer P1 and variable resistor S1A and tube V1A arranged as a diode to ground. The drop across diode V1A to ground is small. The grid of triode V1B is connected to the anode of tube V1A which anode is at near ground potential. With its grid at ground and its cathode at substantially 130 volts positive battery, triode V1B does not conduct. Capacitor C1 is charged over a circuit from grounded positive 130-volt battery through resistor R1, capacitor C1 and from the anode to the cathode of triode V1A to ground.

The operation of relay A so that its armature 3 engages its contact 2, removes ground from the lower terminal of capacitor C2. Triode V2B immediately cuts off because positive 130-volt battery is supplied through resistor R11 to its cathode and its grid is at near ground potential. Capacitor C2 charges to 130 volts potential, the path being from positive 130-volt battery through resistor R11, capacitor C2 and triode V2A arranged as a diode, and in the conducting condition. Relay B, however, remains with its armatures 3 and 5 in engagement with their respective contacts 1 and 2, which is the marking condition, because of the provision of a holding path through the bottom winding of relay B. This path may be traced from grounded positive battery PB through the bottom winding of relay B, resistor R20, contact 1 and armature 3 of relay B to grounded negative battery NG. Capacitor C2 charges to the full 130-volt potential in about 60 milliseconds because the magnitudes of resistor R11 and of capacitor C2 are both relatively small. When the armature 3 of relay A engages its spacing contact 2, ground is applied to the upper terminal of capacitor C1. Application of this ground instantly drives the potential of the lower terminal of capacitor C1 from approximately 0 volts to about 130 volts negative. The grid of triode V1B is connected to the lower terminal of capacitor C1 and the negative potential thereof relative to the ground applied to the cathode of tube V1B maintains tube V1B in the non-conducting condition.

Capacitor C1 now discharges relatively slowly over a path from the bottom terminal of capacitor C1 through the left-hand portion and the adjustable arm of potentiometer S1A and the upper portion and adjustable contact SA of potentiometer P1 to grounded positive battery PB. As capacitor C1 discharges, the potential to ground on the grid of triode V1B rises gradually from approximately negative 130 volts toward zero. When this potential reaches about zero, triode V1B conducts. A circuit is then established from grounded positive battery PB through the upper winding of relay B, from the anode to the cathode of triode V1B and through contact 2 and armature 3 of relay A to ground. The effect of the current flowing in this path through the upper winding of relay B is preponderant over the effect of the current flowing in the holding path through the bottom winding of relay B, which path was traced heretofore. Consequently, armatures 3 and 5 of relay B disengage from their respective contacts 1 and 2 and armature 5 engages with its contact 4, thus opening the path through the output circuit connected to contact 2 to relay B. The engagement of armature 5 with contact 4 prepares a holding path through resistor R10 and the upper winding of relay B which will maintain armatures 5 and 3 in their upper positions for an interval on the succeeding transition. This holding path corresponds to the holding path traced through the bottom winding of relay B and resistor R20 for the preceding transition.

From the foregoing, it is obvious that the mark-to-space transition will be delayed by a time depending upon the values of capacitor C1 and the magnitude of the timing resistors in the potentiometer S1A which are connected in series therewith. The space-to-mark transitions may be delayed in a similar manner.

The bias potentiometer P1 permits a slight adjustment in the mark-to-space delay as compared to the space-to-mark delay so that any slight differences in the capacitor and timing resistor values plus any bias in relays A and B may be compensated.

Figure 2:
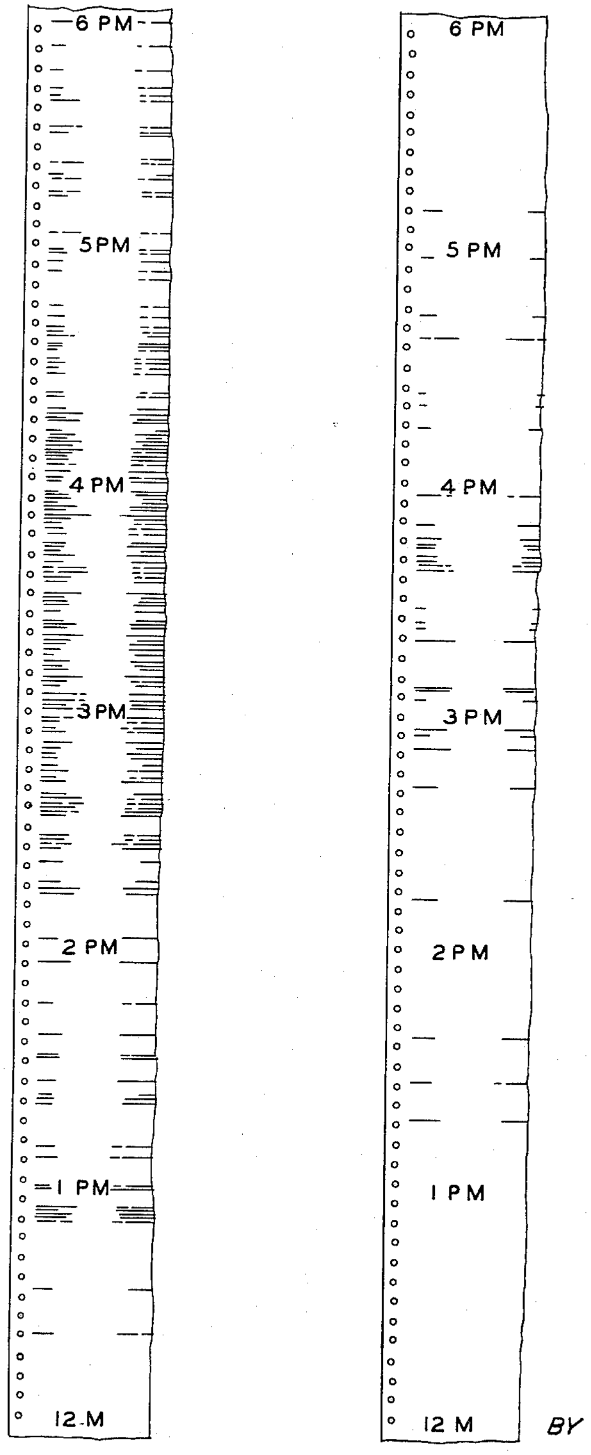
FIG. 2 shows graphs used in explaining the improvement effected by the invention.

Refer now to FIG. 2 which shows graphs of the effect of hits on pulse signal receivers under two conditions which indicate the improvement achieved by the hit suppressor of the present invention. In FIG. 2 at the left and right respectively are shown actual reproductions of time graphs of error producing hits occurring on two pulse circuits, identical in every respect, except that one was equipped and the other was not equipped with a suppressor such as described in the foregoing. The record is in the form of two tapes which were controlled by timers. The records were made at the same time over a six-hour period from 12 noon until 6 o'clock in the evening of a summer's day during which there was electrical disturbance.

In each record an error producing a hit is represented by a broken horizontal line. The comparative record indicates that there were many fewer errors produced on the circuit equipped with the hit suppressor throughout the whole interval. It further indicates that during the interval from about 2:15 p.m. until 4:45 p.m. the frequency of errors on the circuit which was not equipped with a suppressor was such that for most communication purposes it was non-commercial, whereas, in the case of the circuit equipped with the suppressors, the errors were relatively negligible throughout the interval except during the period of most severe electrical disturbance when they were tolerable for most service.

What is claimed is:

1. A hit suppressor for a pulse signaling system, said suppressor comprising a first signal receiver for receiving signals affected by hits, a second signal receiver, responsive to said first receiver, each of said receivers being an electromagnetic relay, both of said relays located at the same telegraph receiving station, said second receiver connected to said first receiver through a signal transition delay means, said delay means having transition delay equalizing means for all signal transitions, said delay equalizing means having means for delaying each mark-to-space and means for delaying each space-to-mark signal transition for equal intervals for both transitions, said equal intervals longer than the duration of prevailing hits, to minimize the effect of said hits.

2. A hit suppressor in accordance with claim 1, said suppressor having means for adjusting the duration of said delay for hits of differing durations at different times.

3. A hit suppressor in accordance with claim 1, said delay means comprising a first and a second delay channel in said transition delay means and means for impressing said marking signals on said first channel and said spacing signals on said second channel.

4. A hit suppressor comprising a first signal receiver, said receiver having means for actuating it to a first and a second condition in response to the reception of signals of a first and a second condition, respectively, a first and a second delay circuit, connected to said receiver, said first delay circuit and said second delay circuit each individually responsive to said actuation to said first and said second condition, respectively, a second signal receiver responsive cooperatively to said first and said second delay circuits, each of said receivers being an electromagnetic relay, both of said relays located at the same telegraph receiving station, and means interconnecting said first and said second delay circuit and said second receiver, responsive to each of said signal transitions of said first receiver, for delaying each transition of said second receiver by an equal amount, to minimize the effect of hits.

5. A hit suppressor for a pulse signaling system, having first means therein responsive to the reception of signals for delaying signal transitions by an amount exceeding the duration of hits prevailing at a first time and second means therein, connected to said first means, for adjusting the duration of said delay so that it exceeds the duration of hits prevailing at a second time, said first means comprising a first electromagnetic, direct-current telegraph signal receiving relay responsive to marking and spacing signals impressed thereon, a first individual signal delay channel connected to said relay for delaying marking signal transitions, a second individual signal delay circuit connected to said relay for delaying spacing signal transitions, an auxiliary electromagnetic direct-current telegraph receiving relay having a first and a second winding thereon connected individually in tandem to said first relay through said first and said second channels, respectively, each of said channels having a resistor-capacitor delay and a rectifier responsive to said first relay and a space discharge device jointly responsive to said first relay and to said rectifier, said auxiliary relay responsive to said space discharge devices.

6. A hit suppressor for suppressing hits impressed on a signal receiver arranged to receive direct-current telegraph marking and spacing signals, said suppressor having a first electromagnetic signal receiving relay for receiving said marking and spacing signals, and said hits, a first signal delay channel connected to and responsive to said first relay, said channel having means therein for delaying marking-to-spacing signal transitions for an interval longer than prevailing hits, a second signal delay channel connected to and responsive to said first relay, said second channel having means therein for delaying spacing-to-marking signal transitions for an interval longer than prevailing hits, said means in each of said channels comprising an individual resistor-capacitor delay, an individual rectifier and an individual space discharge device for each of said channels, said discharge device jointly responsive to said resistor-capacitor delay and said rectifier, a second electromagnetic signal receiving relay having a first and a second winding thereon connected to and responsive to said first and said second signal delay channel, respectively, whereby said second relay responds only to signals of longer duration than said hits, to suppress said hits.

7. A hit suppressor in accordance with claim 6 having manually operable means therein for adjusting said delay, as required, when the duration of said hits changes.

References Cited in the file of this patent

UNITED STATES PATENTS

| | | |
|---|---|---|
| 2,265,996 | Blumlein | Dec. 16, 1941 |
| 2,414,488 | Shanck | Jan. 21, 1947 |
| 2,424,961 | Bancroft et al. | Aug. 5, 1947 |
| 2,554,847 | Vanderlippe | May 29, 1951 |
| 2,619,541 | Van Duuren | Nov. 25, 1952 |
| 2,707,751 | Hance | May 3, 1955 |